United States Patent [19]

Minakuchi et al.

[11] Patent Number: 6,064,504
[45] Date of Patent: May 16, 2000

[54] SCANNING OPTICAL DEVICE

[75] Inventors: Tadashi Minakuchi; Masahiro Oono; Mitsunori Iima; Hiroshi Kanazawa, all of Tokyo, Japan

[73] Assignee: Asahi Kogaku Kogyo Kabushiki Kaisha, Tokyo, Japan

[21] Appl. No.: 08/791,977

[22] Filed: Jan. 31, 1997

[30]     Foreign Application Priority Data

Jan. 31, 1996  [JP]  Japan .................................... 8-037266
Feb. 8, 1996   [JP]  Japan .................................... 8-046751

[51] Int. Cl.$^7$ ..................................................... G02B 26/08
[52] U.S. Cl. ........................... 359/210; 359/201; 359/206
[58] Field of Search .................................. 359/196, 197, 359/201, 206, 207, 210

[56]             References Cited

U.S. PATENT DOCUMENTS 4,859,011   8/1989   Takanashi ............................... 359/207

FOREIGN PATENT DOCUMENTS

2-198413   8/1990   Japan .
2-240617   9/1990   Japan .
2-140510   11/1990  Japan .
4-156414   5/1992   Japan .................................... 359/210

*Primary Examiner*—Darren E. Schuberg
*Attorney, Agent, or Firm*—Greenblum & Bernstein, P.L.C.

[57]              ABSTRACT

A scanning optical device includes a light source that emits a light beam; a deflector for deflecting and scanning the light beam from the light source; a scanning lens for converging the deflected light beam onto an image surface; and a mechanism for adjusting the relative position of at least one lens element of the scanning lens with respect to other lens elements of the scanning lens in an auxiliary scanning direction. Preferably, the adjustable lens element of the scanning lens be provided with an anamorphic surface having relatively larger power in the auxiliary scanning direction than in the main scanning direction. Alternatively, the above-mentioned at least one lens element may have the largest absolute value of refractive power of the lenses in the scanning lens. Further alternatively, the above-mentioned at least one lens element may be provided with a surface having the smallest absolute value of radius of curvature of all surfaces in the scanning lens.

10 Claims, 9 Drawing Sheets

SCANNING OPTICAL DEVICE

Background of the Invention

The present invention concerns a scanning optical device provided in a laser beam printer or the like for scanning a light beam.

A scanning optical device includes a light source such as a semiconductor laser, a polygon mirror for deflecting and scanning a light beam emitted from the light source, and an fθ lens that converges the light beam onto an image surface such as a photoconductive drum to form a scanning beam spot. Additionally, a cylindrical lens is provided between the light source and the polygon mirror, to form a linear image in the vicinity of the reflecting surface of the polygonal mirror.

Conventionally, the cylindrical lens is used to compensate for shape defects of the beam spot due to misalignment of a lens in the optical system. Accordingly, in a conventional scanning optical device, the cylindrical lens is adjustable, for example, slidable in an auxiliary scanning direction and may also be rotatable about the optical axis. The shape of the beam spot is measured at positions adjacent to the image surface during assembly. This measurement and adjustment are repeated until the measured shape of the beam spot is acceptable.

Further, a bow of the scanning line (i.e. when the scanning line is curved) in the auxiliary scanning direction should also be compensated for in a scanning optical device having relatively high resolution. Since the bow of the scanning line occurs due to the misalignment of a lens in the auxiliary scanning direction, it can be compensated for by adjusting the cylindrical lens in the auxiliary scanning direction. Although the shift of the cylindrical lens may compensate for the bow of the scanning line, the shape of the beam spot will also be varied by this movement of the cylindrical lens and the variation of shape caused is larger than the amount of compensation provided for the bow of the scanning line.

SUMMARY OF THE INVENTION

It is therefore an object of the present invention to provide a scanning optical device that allows easy adjustment of both the beam shape and the bow of the scanning line.

According to an aspect of the present invention, the scanning optical device includes a light source that emits a light beam; a deflector for deflecting the light beam from the light source; a scanning lens for converging the deflected light onto an image surface; and a mechanism for adjusting the relative position of at least one lens element of the scanning lens with respect to other lens elements of the scanning lens in an auxiliary scanning direction.

Preferably, the scanning optical device further includes a linear image forming lens that is disposed between the light source and the deflector for forming a linear image in the auxiliary scanning direction. The linear image forming lens may be, for example, a cylindrical lens. In this case, the scanning optical device may also include a mechanism for adjusting the position of the linear image forming lens in the auxiliary scanning direction.

Also preferably, the above-mentioned at least one lens element of the scanning lens is adjustably supported by a supporting member. Also, it is preferable that the above-mentioned at least one lens element be provided with an anamorphic surface having a relatively larger power in the auxiliary scanning direction than in the main scanning direction. Alternatively, the above-mentioned at least one lens element may have the largest absolute value of refractive power of the lenses in the scanning lens. Further alternatively, the above-mentioned at least one lens element may be provided with a surface having the smallest absolute value of radius of curvature of all surfaces in the scanning lens.

According to another aspect of the invention, there is provided a scanning optical device comprising a light source that emits a light beam; a linear image forming lens for forming a linear image in an auxiliary scanning direction; a deflector for deflecting the light beam from the linear image forming lens; a scanning lens for converging the deflected light onto an image surface. In particular, the relative position of at least one lens element of the scanning lens with respect to the other lens elements of the scanning lens is adjustable in an auxiliary scanning direction. Further, the position of the linear image forming lens may also be adjustable in the auxiliary scanning direction.

DETAILED DESCRIPTION OF THE PREFERRED EMBODIMENTS

A scanning optical device according to the present embodiment is described with reference to FIGS. 1 through 10. The embodiment described is directed to a multi-beam scanning optical device that scans a plurality of light beams across a predetermined angle producing eight scanning lines per scan on a surface, such as the surface of a photoconductive member.

Figure 1:
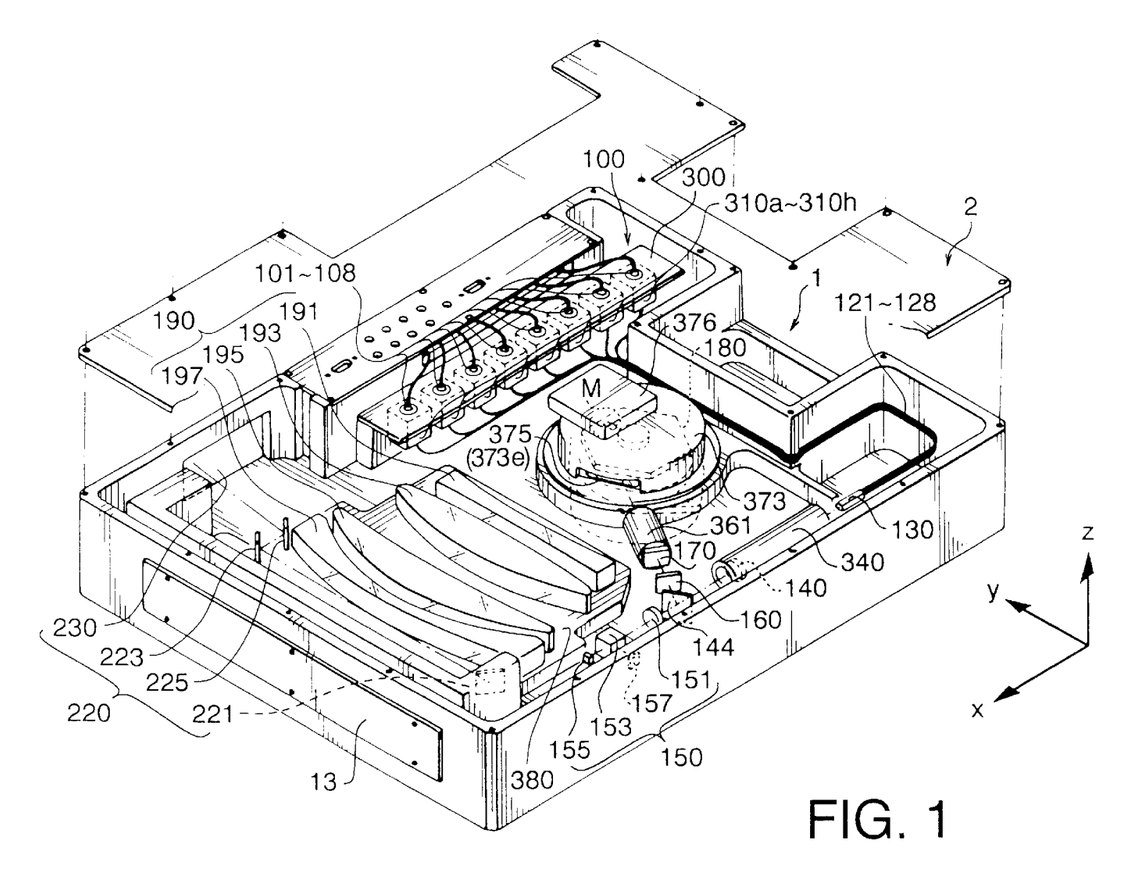
FIG. 1 is a perspective view showing a scanning optical device.
Figure 2:
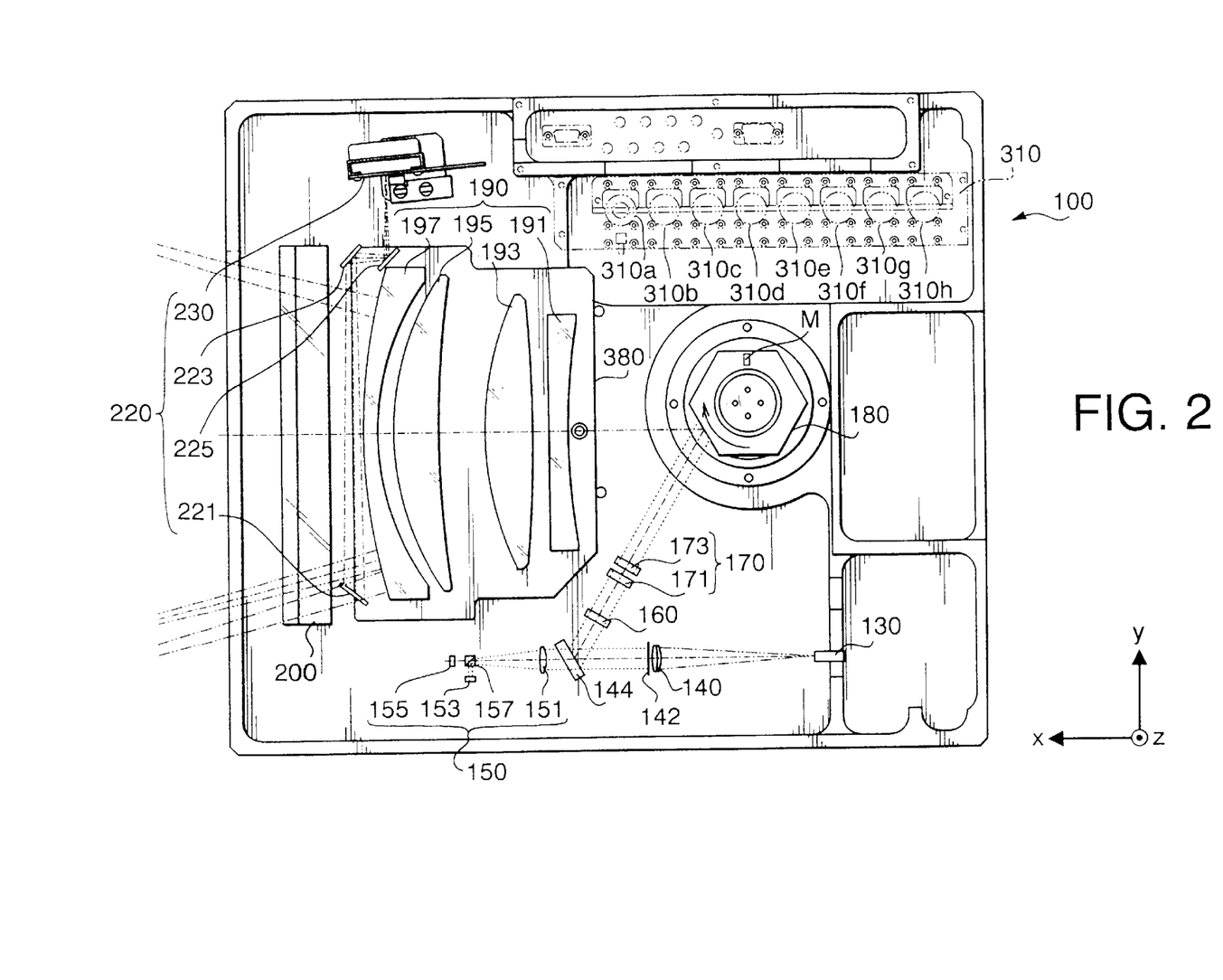
FIG. 2 is a plan view of the scanning optical device shown in FIG. 1 in a main scanning direction.

The structure of the scanning optical device is first described with reference to FIGS. 1 to 4. FIG. 1 shows a perspective view of the scanning optical device, FIG. 2 shows a plan view thereof, FIG. 3 shows a cross-sectional view thereof, and FIG. 4 shows an optical configuration of the scanning optical device.

Figure 3:
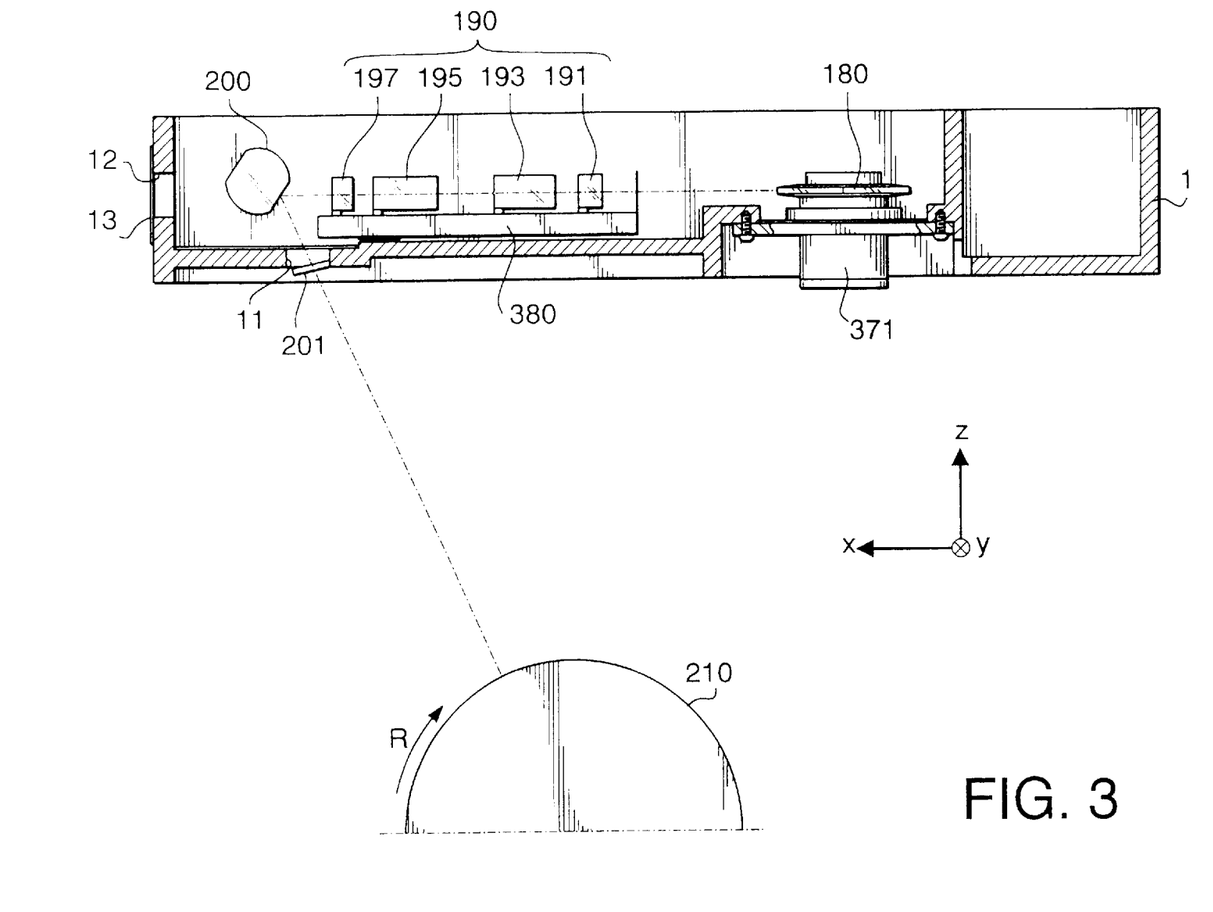
FIG. 3 is a cross-sectional view of the scanning optical device shown in FIG. 1 in an auxiliary scanning direction.
Figure 4:
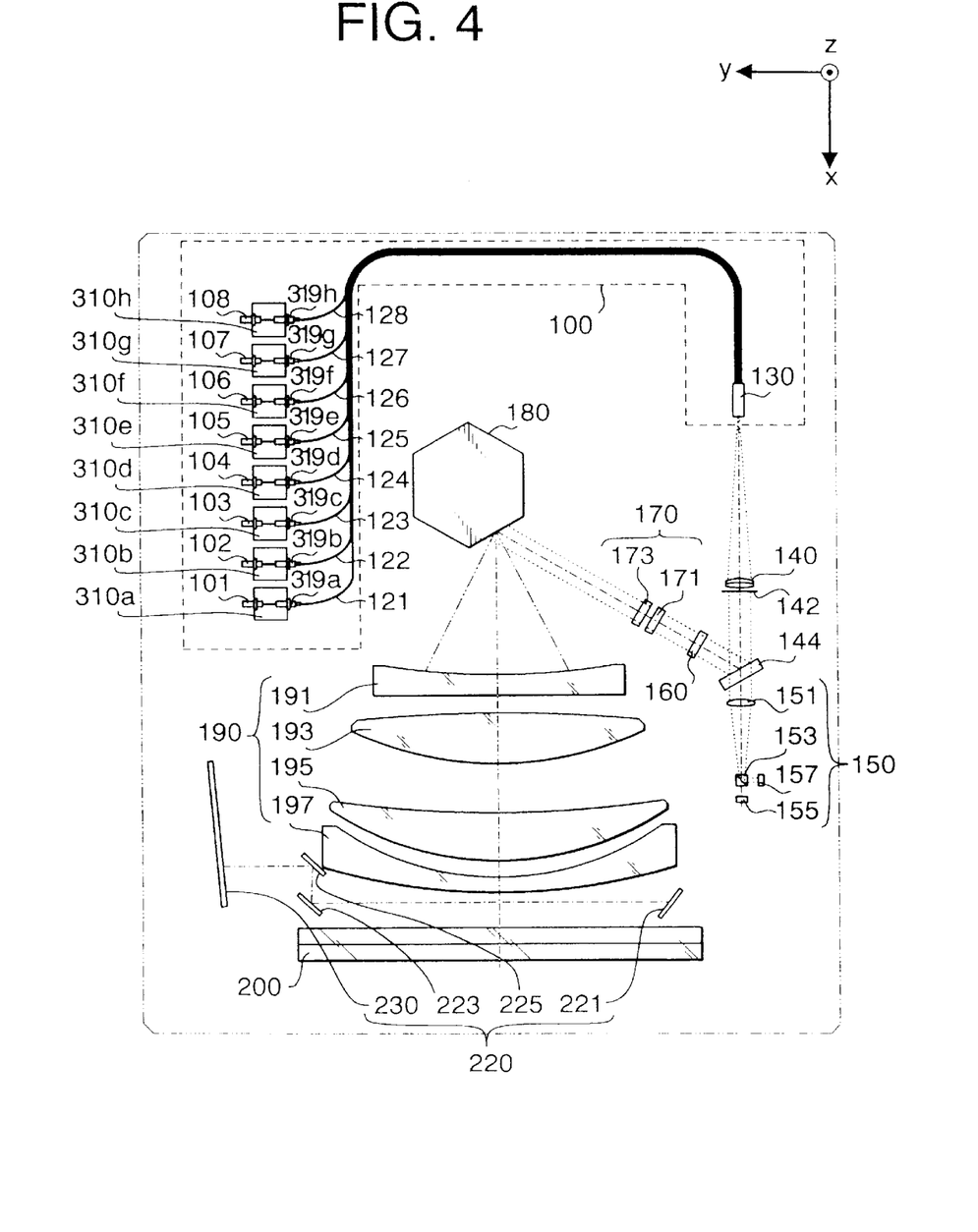
FIG. 4 shows the optical configuration of the scanning optical device of FIG. 1 in the main scanning direction.

As shown in FIGS. 3 and 4, the scanning optical device comprises a light transmission device 100, a polygon mirror 180, and an fθ lens 190 (scanning lens). In operation, eight light beams are emitted from the light transmission device 100, deflected (scanned) by the polygon mirror 180, pass through the fθ lens 190, to form eight scanning lines on a photoconductive surface, such as a photoconductive drum 210.

Throughout this specification, a "main scanning direction" is defined as a direction in which a light beam scans across the surface of a photoconductive member, and an "auxiliary scanning direction" is a direction in which the photoconductive member is translated or rotated to position the member for a subsequent main scan. The main scanning and auxiliary scanning directions are perpendicular to one another, and are both perpendicular to the optical axes of lenses guiding the light beams. Since a light beam typically is reflected or "folded" several times in the transmission from the light source to a photoconductive member, the main scanning and auxiliary scanning directions are not absolute, but are generally referred to with reference to the optical axis at a particular point along the optical path.

In this specification, an XYZ coordinate system is defined in each of FIGS. 1 through 4. The X axis is an axis parallel to the optical axis of the fθ lens 190, and the Y and Z axes are orthogonal to each other in the plane perpendicular to the X axis. The Y axis is parallel with the main scanning direction, and the Z axis is parallel with the auxiliary scanning direction.

As shown in FIG. 1, the scanning optical device further includes an open casing 1. In use, the top opening of the casing 1 is closed by an upper cover lid 2.

As shown in FIG. 4, the light transmission device 100 includes eight semiconductor lasers 101 through 108; eight laser blocks 310a through 310h (each attached to a supporting substrate 300), corresponding to each of the lasers 101 through 108; eight silica glass optical fibers 121 through 128, also corresponding to each of the lasers 101 through 108; and a fiber alignment block 130. Each of the lasers 101 through 108 is mounted in the corresponding laser block 310a through 310h such that the respective light beams are guided to enter the corresponding optical fibers 121 through 128. Furthermore, the incident end portions of the optical fibers 121 through 128 are retained by fiber supporting members 319a through 319h fixed at the laser blocks 310a through 310h, respectively. The fiber alignment block 130 secures the exit end portions of the optical fibers 121 through 128 for aligning the eight optical fibers 121 through 128 such that eight point light sources are formed in a straight line.

A diverging light beam emitted from the fiber alignment block 130 is collimated by a collimator lens 140 held by a cylindrical collimator lens barrel 340, and is directed through an aperture 142. The aperture 142 defines a rectangular opening, longer in the main scanning direction, designed to regulate the beam shape (in the main scanning and auxiliary scanning directions) of the light beam emitted from the collimate lens 140.

The light beam that passes through the aperture 142 is directed to a beam splitter 144. The beam splitter 144 splits the light beam causing a part of the light beam to be transmitted as a monitor beam and the remaining part to be reflected as a main beam. The transmissivity of the beam splitter 144 (i.e., the amount of light transmitted as a monitor beam) is, for example, from 5 to 10 percent as a mean value of S polarized light and P polarized light.

The monitor beam is directed into an automatic power control (APC) sensor system 150. The APC sensor system 150 includes a collective lens 151 for converging the monitor beam; a polarization beam splitter 153 which splits the light beam into two linear polarization components that are orthogonal to each other; a first APC light receiving element 155; and a second APC light receiving element 157.

The first and second APC light receiving elements 155 and 157 detect the light energy of the respective linear polarization components, and the output of the light receiving elements 155 and 157 is used for a feedback control of the output of the semiconductor lasers 101 through 108.

The main beam reflected by the beam splitter 144 is transmitted through a dynamic prism 160. The dynamic prism 160 is rotatably disposed about an axis orthogonal to the optical axis to control the spot position in the auxiliary scanning direction on the image plane. That is, the dynamic prism 160 is preferably a wedge prism, supported to be rotatable about the main scanning direction in order to deviate the direction of the light beam in the auxiliary scanning direction. The dynamic prism 160 corrects changes in the position of image spots (in the auxiliary scanning direction) on the scanning plane resulting from either or both of tilting error of the reflecting surfaces of the polygon mirror 180 and unevenness of rotation of a photoconductive drum 210 (shown in FIG. 3, and described later).

The main beam transmitted through the dynamic prism 160 forms a linear image in the vicinity of the mirror surface of the polygonal mirror 180 by means of a cylindrical lens 170. The cylindrical lens 170 has positive power only in the auxiliary scanning direction. As shown in FIGS. 1 and 2, the cylindrical lens 170 is supported by a cylindrical lens barrel 361 and is composed of two lenses 171, 173 having positive and negative power, respectively, in the auxiliary scanning direction.

As shown in FIG. 3, the polygonal mirror 180 is driven by a mirror motor 371 (fixed in the casing 1), and rotates clockwise from the viewpoint of FIG. 2 (shown by an arrow). Furthermore, as shown in FIG. 1, the polygonal mirror 180 is isolated from the atmosphere by a cup-like polygon cover 373 in order to prevent the generation of sound due to rotations, and to avoid damage to the mirror surface from collisions with dust or debris in the air.

An optical path opening 373e is formed at the side of the polygon cover 373, and a cover glass 375 is fitted in the optical path opening 373e. The main beam transmitted through the cylindrical lens 170 enters the polygon cover 373 through the cover glass 375, is deflected by the polygonal mirror 180, and is directed outward, passing again through the cover glass 375. Furthermore, a mark M is attached to or marked on the top surface of the polygonal mirror 180 and a sensor block 376 containing a sensor for detecting the mark M is provided on the top surface of the polygon cover 373.

A polygonal mirror may have facial errors (shape errors) on the reflection surfaces that are produced during manufacturing. This manufacturing error is often uneven between the respective reflection surfaces (i.e. between and among each side of the polygonal mirror). In order to compensate for these facial errors, the error quantity of each surface of the polygonal mirror 180 can be measured and stored in a memory (not shown) during the manufacture of the scanning optical device. Then, by distinguishing which reflection surface of the polygonal mirror 180 is currently being used for scanning, for example, according to the output of the sensor in the sensor block 376, at least the beam position and beam intensity may be corrected according to the error quantity inherent to each of the reflection surfaces of the polygonal mirror 180.

As shown in FIG. 3, the main beam reflected by the polygonal mirror 180 passes through the fθ lens 190 (an image forming optical system) and is reflected by a fold-over mirror 200 to the photoconductive drum 210, forming eight beam spots. The beam spots scan according to rotations of the polygonal mirror 180, forming eight scanning lines per scan on the photoconductive drum 210. The photoconductive drum 210 is driven and rotated in the direction of the arrow R in synchronization with the scanning of the beam spots, to form an electrostatic latent image on the photoconductive drum 210. The latent image is then transferred onto a sheet of paper (not shown) by a known electronic photography process.

The fθ lens 190 includes first, second, third and fourth lenses 191, 193, 195, 197 arranged in order from the polygonal mirror 180 side to the fold-over mirror 200 side, having negative, positive, positive and negative power in both the main scanning and auxiliary scanning directions, respectively. The first, second, third and fourth lenses 191, 193, 195, 197 are arranged on a lens base 380. The combination of first, second, third and fourth lenses 191, 193, 195, 197 in the fθ lens 190 operates such that the light beam that was linearly formed as an image in the auxiliary scanning direction at the polygonal mirror 180 is elliptically formed as an image on the photoconductive drum 210.

The first lens 191 of the fθ lens 190 is a negative lens having a concave spherical surface on the polygonal mirror 180 side, and a cylindrical surface having negative power only in the auxiliary scanning direction on the foldover mirror 200 side. The surfaces of the lens are designed such that, the first lens 191 has a comparatively large negative (i.e. more negative) power in the auxiliary scanning direction and a comparatively small negative power in the main scanning direction.

The second lens 193 of the fθ lens 190 is a meniscus-shaped toric lens having a convex-spherical surface on the polygonal mirror 480 side and a convex toric surface on the fold-over mirror 200 side. The surfaces of the lens are designed such that the second lens 193 has a comparatively large positive (i.e. more positive) power in the auxiliary scanning direction and a companatively small positive power in the main scanning direction.

The third lens 195 is a positive meniscus lens having two spherical surfaces.

The fourth lens 197 is a negative meniscus lens having two spherical surfaces.

The main beam transmitted through the fθ lens 190 is detected by a synchronization sensor system 220 at each scan (i.e. for each surface of the polygonal mirror 180). The synchronization sensor system 220 is positioned in the optical path between the fourth lens 197 of the fθ lens 190 and the fold-over mirror 200. The synchronization sensor system 220 includes first, second, and third mirrors 221, 223, 225, and a synchronization light sensor 230 which receives the light beams reflected by the mirrors 221, 223, 225. The first mirror 221 is positioned in the optical path from the polygonal mirror 180 to the fold-over mirror 200 at one edge of the main scanning range, but outside of a predetermined image forming range (not shown). The second and third mirrors 223 and 225 are positioned outside of the optical path on an opposite side to the first mirror 221. The synchronization light sensor 230 is disposed at a position optically equivalent to the position on the surface of the photoconductive drum 210 at which scanning occurs. Thus, in each main scan, the eight light beams are sequentially reflected by the first, second, and third mirrors 221, 223, 225 and strike the synchronization light sensor 230. A signal or signals output by the synchronization light sensor 230 are then used to synchronize the transfer of image data equivalent to one scan from a drive circuit (not shown) to drive the semiconductor lasers 101 through 108 according to the image data.

An image forming opening 11 which permits the main beam (including the eight individual light beams) reflected by the fold-over mirror 200 to be transmitted to the photoconductive drum 210 is formed in the casing 1. A cover glass 201 is attached to the image forming opening 11.

An inspection opening 12 is formed behind the fold-over mirror 200. The inspection opening 12 is used when adjusting optical elements after the optical elements (excluding the fold-over mirror 200) are assembled. As shown in FIG. 3, the inspection opening 12 is covered by an opaque cover plate 13 in normal use.

The adjustment of the scanning optical device is now described in detail. In operation, the light beam, that exits from the fθ lens 190 (i.e. the image forming lens) and is then reflected by the fold-over mirror 200, passes through the image forming opening 11 to contact the surface of the photoconductive drum 210 (the image plane). The image forming opening 11 has a rectangular shape and is larger than the scan range such that the light beam from the fold-over mirror 200 can pass through to the photoconductive drum 210.

During adjustment, the mirror 200 is removable from the casing 1 to allow the light beam to reach the inspection opening 12. The inspection opening 12 also has a rectangular shape that is larger than the scan range. The inspection opening 12 is positioned in line with the optical axis of the fθ lens 190, such that, when the fold-over mirror 200 has been removed, the light beam exiting from the fθ lens 190 is transmitted through the inspection opening 12. As described above, the inspection opening 12 is provided with the cover 13 that is placed over the inspection opening 12 when the inspection opening 12 is not in use in order to prevent dust from entering inside the casing 1. Preferably, the cover 13 is screwed onto the casing 1 to prevent accidental removal.

Figure 5:
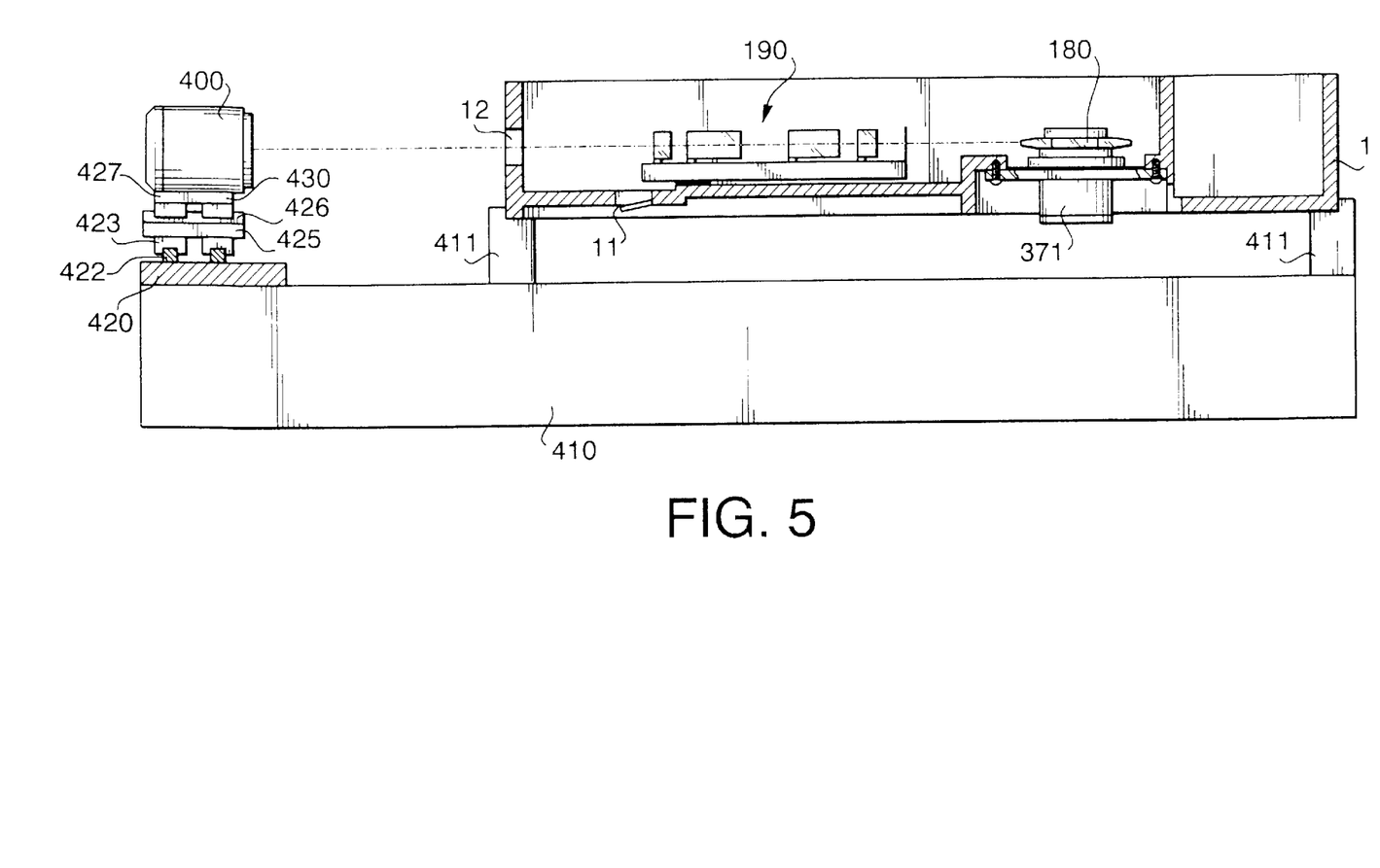
FIG. 5 is a side view showing the scanning optical device during an adjustment process.

FIG. 5 shows the scanning optical device as configured for the adjustment process. During adjustment, the scanning optical device is mounted on a base frame 410. The base frame 410 is provided with leg parts 411, which support the casing 1 in a horizontal manner. The cover 13 is removed, such that, the light beam transmitted through the fθ lens 190 passes through the inspection opening 12 parallel to the horizontal plane of the casing 1.

The base frame 410 is provided with a measuring device 400 for measuring the beam diameter of the light beam. The measuring device 400 is positioned in the optical axis direction of the light exiting from the inspection opening 12. The measuring device 400 includes a light receiving face that receives the light beam that exits from the inspection opening 12.

In order to support the measuring device 400, the base frame 410 is further provided with a unit frame 420, which is a plate member fixed to base frame 410, a pair of guide rails 422, which extend in the main scanning direction (Y direction; direction orthogonal to the paper surface in FIG. 7), that are provided on the unit frame 420, bearings 423 that are movably engaged with each of the guide rails 422; and a table 425 that is fixed to the bearings 423. Further, guide rails 426, which extend in the optical axis direction (X direction) are formed on the table 425 and bearings 427 are movably engaged with the guide rails 426. Lastly, a holding plate 430, which holds the measuring device 400, is fixed to the bearings 427. The measuring device 400 is thus movable in both the main scanning direction (Y direction) and the optical axis direction (X direction).

The fine adjustment of the optical system using the inspection opening 12 shall now be described in outline with reference to FIG. 6. In manufacturing a scanning optical device, the scanning optical device is first assembled and then fine adjustment of the elements of the scanning optical device is performed by measuring the tilt, curvature, and the like of the image plane.

During this process, the polygon mirror 180 is stopped and a single laser is used to generate a light beam. The light beam passes through the inspection opening 12 and forms a stationary beam spot on an image plane F as shown in FIG. 6.

The beam spot size is measured at several positions in the optical axis X direction by the measuring device 400, and the position at which the beam spot size is the minimum is the beam waist position, in other words, the image position.

Figure 8:
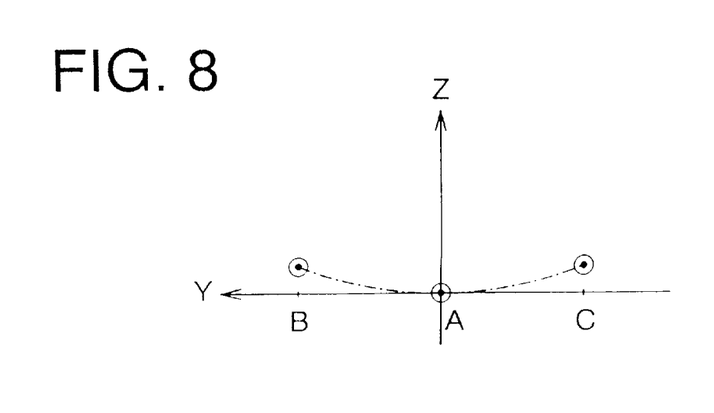
FIG. 8 is a chart showing an example of a scanning curvature.

A similar measurement of the image position is also performed for several positions in the main scanning direction (the central A part and the B and C parts at the ends of the main scan, as shown in FIG. 8), and the tilt or curvature of the image plane is calculated based on the accumulated data.

Figure 6:
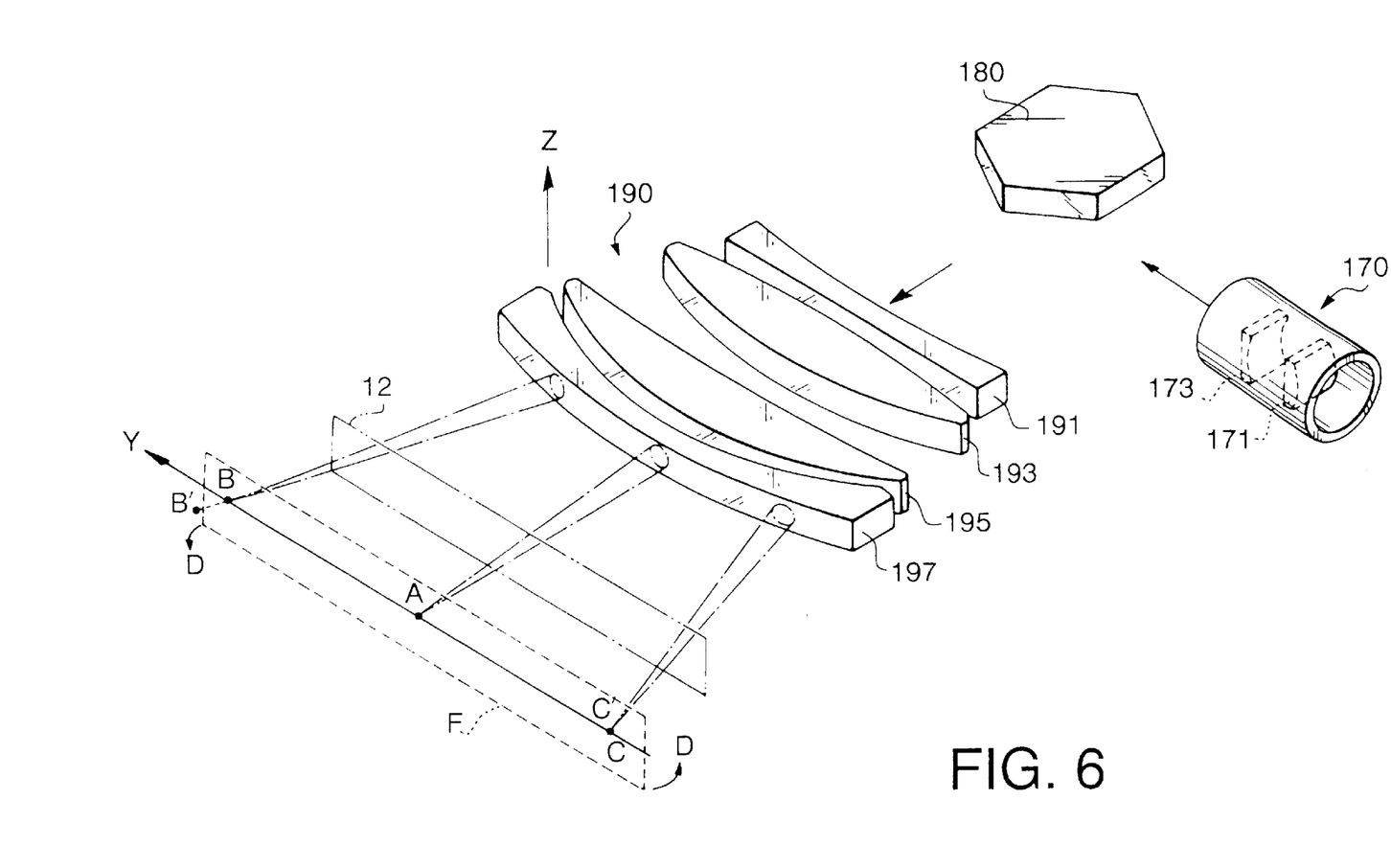
FIG. 6 is a perspective view of an fθ lens showing a resulting image plane.

Thus, for example, in FIG. 6, if an image position, which should be at point B, is located at point B' and the image position, which should be at point C, is located at point C', it can be determined that the image plane F is tilted (or rotated) in the direction of the arrow D. In such a case, the adjustment of the tilt of a suitable lens in the fθ lens 190 and other fine adjustments are performed until the image positions at points B' and C' are shifted to points B and C, respectively.

Figure 7A:
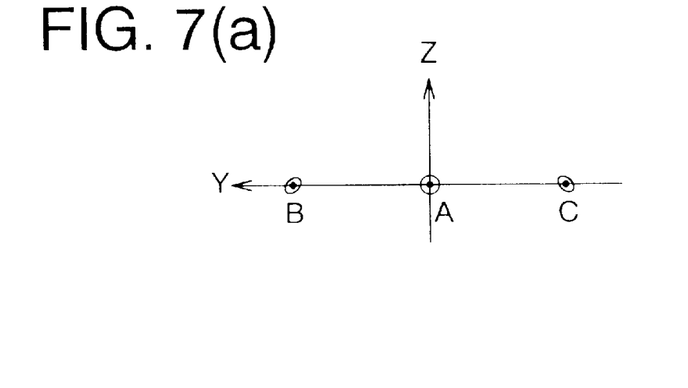
FIGS. 7(a) and 7(b) are charts showing examples of beam shape defects.
Figure 7B:
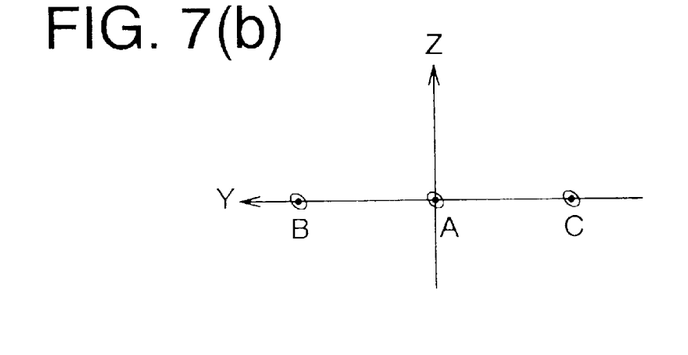

FIGS. 7(a) and 7(b) are charts showing example beam shape defects. As shown in FIG. 7(a), the beam shape is sometimes deformed to produce a symmetrically unbalanced oval-shape at measuring points B and C in the main scanning direction.

This phenomenon can be corrected by a positional shift of one of the lenses of the scanning optical system in the auxiliary scanning direction (Z direction). In the present embodiment, since the cylindrical lens 170 is the smallest and therefore easiest to move of the lenses, the cylindrical lens 170 is designed such that it can be linearly adjusted in the auxiliary scanning direction (Z direction).

As shown in FIG. 7(b), the beam shape is sometimes deformed such that the beam spot is inclined in the same direction at measuring points A, B and C in the main scanning direction. This phenomenon can be corrected by rotation of a toric lens or anamorphic lens about the optical axis of the scanning optical system. In this case as well, since the cylindrical lens 170 is the smallest lens, the cylindrical lens 170 is designed to be capable of rotary adjustment around its optical axis.

Further, as shown in FIG. 8, the beam spots sometimes shift in the auxiliary scanning direction at measuring points B and C of the main scanning direction, i.e. the scanning line curves as shown by the dotted line in FIG. 8. This phenomenon (called "a bow") can be corrected by a positional shift of one of the lenses of the scanning optical system in the auxiliary scanning direction (Z direction).

Here, however, the shift of the cylindrical lens 170 also produces a change in the beam shape. Further, the change in the beam shape caused by the movement of the cylindrical lens 170 is larger than the change in the curvature (bow) of the scanning line.

According to this embodiment, the scanning line curvature is corrected by moving one of the four fθ lenses 190 (one of the first lens 191, the second lens 193, the third lens 195 and the fourth lens 197) in the auxiliary scanning direction (Z axis direction).

Of the fθ lenses, the linear adjustment of the lens with the greatest power in the auxiliary scanning direction produces a greater change in the scanning line for a given amount of linear adjustment of the lens. The lens to be adjusted should be: (1) a lens with an anamorphic surface wherein the curvature in the auxiliary scanning direction is larger than in the main scanning direction, (2) a lens with the greatest power or (3) the lens which has the curvature radius with the smallest absolute value. Alternatively, (4) the lens furthest from the scanning surface, i.e. the lens nearest to the polygon mirror 180. This later criteria (4) is preferred since the degree of linear adjustment for this lens is more pronounced than for other lenses.

In this embodiment, the second lens 193 of the fθ lens 190 is chosen as the adjustable lens and is arranged in an adjustable manner as described with reference to FIG. 9.

Figure 9:
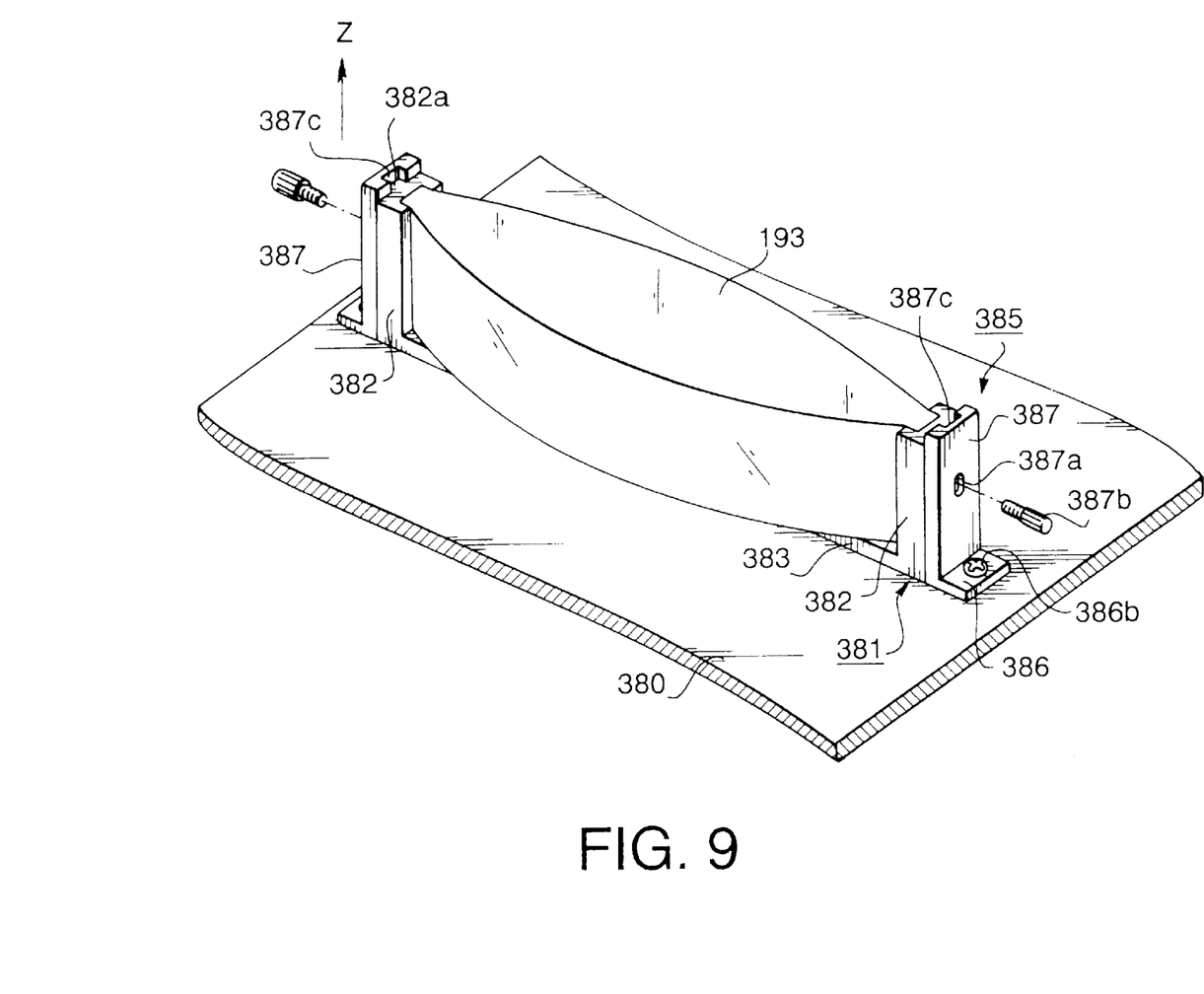
FIG. 9 is a perspective view of a mechanism for a linear adjustment of a particular lens in the fθ lens.

FIG. 9 is a perspective view of the second lens 193 and its mounting structure. The ends of the second lens 193 in the main scanning direction (lengthwise direction) are supported by an anchoring block 381. The anchoring block 381 includes two lateral sections 382 which secure the lengthwise ends of the second lens 193 to restrict the second lens 193 from moving in the optical axis direction. The anchoring block 381 also includes a base 383 extending along the bottom side of the second lens 193.

The anchoring block 381 is supported on the lens base 380 by two L-shaped supports 385. Each of the L-shaped supports 385 include a horizontal section 386 and a vertical section 387. The horizontal section 386 is anchored to the lens base 380 by an anchoring screw 386b.

The vertical section 387 of the L-shaped supports 385 includes, on the anchoring block 381 side, a guide groove 387c extending vertically (auxiliary scanning direction). Further, a guide column 382a is formed at each side of the anchoring block 381 to engage with the respective guide groove 387c. The engagement of the guide columns 382a and the guide grooves 387 allows the anchoring block 381 to be movable only in the vertical direction (auxiliary scanning direction (Z axis direction)).

Also, the vertical section 387 of the L-shaped supports 385a is formed to include a long hole 387a extending in the vertical direction and the anchoring block 381 is provided with a screw hole (not shown) such that the anchoring block 381 can be secured to the L-shaped base 385 by engagement of an anchoring screw 387b through the long hole 387a into the screw hole formed in the anchoring block 381. The long holes 387a are formed long enough to allow the adjustment of the anchoring block 381 in the vertical direction (auxiliary scanning direction (Z axis direction)).

With this arrangement, the anchoring block 381 can be adjusted linearly in the vertical direction (auxiliary scanning direction (Z direction)) by loosening the anchoring screws 387b.

As constructed above, the scanning line curvature (bow) is corrected by shifting the second lens 193 in the auxiliary scanning direction (Z axis direction). Further, if the shift of the second lens 193 causes a change in the beam shape, the beam shape can be corrected by a positional shift of the cylindrical lens 170.

In the present embodiment, the second lens 193 of the fθ lens 190 is capable of linear adjustment, however, the first lens 191, third lens 195 or fourth lens 197 may also be made capable of linear adjustment by providing a similar arrangement as that for the second lens 193.

An arrangement allowing the linear and rotatable adjustment of the cylindrical lens 170 is now described with reference to FIG. 10.

Figure 10:
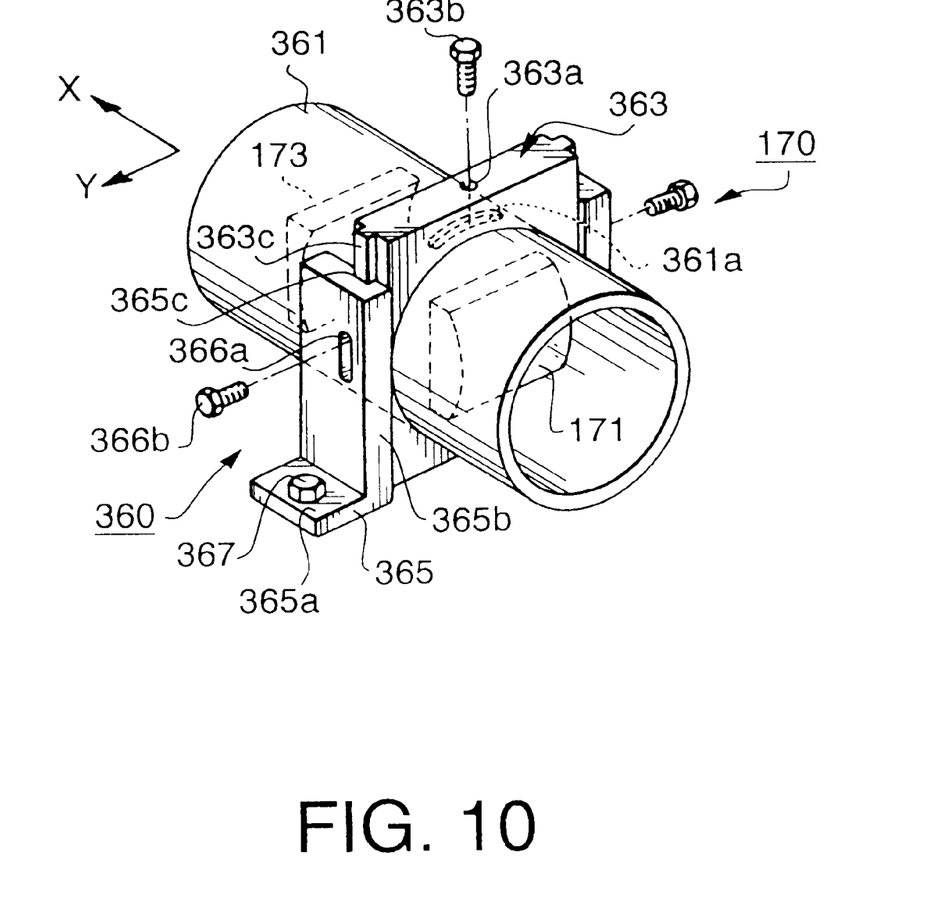
FIG. 10 is a perspective view of a mechanism for a rotary and linear adjustment of a cylindrical lens.

FIG. 10 shows a mounting structure 360 for the cylindrical lens 170. The mounting structure includes a cylindrical member 361, a slide bearing 363, and two L-shaped supports 365.

In this embodiment, the cylindrical lens 170 includes a first lens 171 and a second lens 173 with positive and negative curvatures, respectively, in the auxiliary scanning direction. The first lens 171 and the second lens 173 are supported by the cylindrical member 361. The cylindrical member 361 is formed as a cylinder around the center of the optical axes of the first lens 171 and second lens 173. A groove 361a of a predetermined length is formed around the outside of the cylindrical member 361.

The slide bearing 363 is formed such that the cylindrical member 361 is supported in a rotatable manner in a central opening in the slide bearing 363. In other words, the cylindrical member 361 is supported by the slide bearing 363 such that the cylindrical member 361 is rotatable around the optical axis of the cylindrical lens 170.

Further, the exterior shape of the slide bearing 363 is rectangular, and a screw hole 363a is formed on an upper side thereof. An anchoring screw 363b is the screwed into the screw hole 363a to make contact with the bottom of the groove 361a to secure the rotational position of the cylindrical member 361. That is, the cylindrical member 361 can be rotated by loosening the anchoring screw 363b, and can be locked to prevent its rotation by tightening the anchoring screw 316a.

The slide bearing 363 is supported by the pair of L-shaped supports 365. Guide columns 363c are formed at the sides of the slide bearing 363 to secure the slide bearing 363 to the L-shaped supports 365. The L-shaped supports 365 are secured to the casing 1 by bolts 367. Each L-shaped support 365 includes a horizontal section 365a and a vertical section 365b. The vertical section 365a of the L-shaped support 365 includes, at the slide bearing 363 side, a guide groove 365c extending in the vertical direction which engages with the respective guide column 363c of the slide bearing 363. Thus, the slide bearing 363 is linearly movable in the vertical direction, i.e. the auxiliary scanning direction (Z axis direction).

Further, a long hole 366a extending in the vertical direction is formed in the vertical section 365a such that an anchoring screw 366b can be screwed through the long hole 366a into a screw hole (not shown) formed in the side of the slide bearing 363. The long hole 366a is formed long enough to allow adjustment of the slide bearing 363 in the vertical direction, i.e. the auxiliary scanning direction (Z axis direction).

As a result of this arrangement, the cylindrical member 361 can be linearly adjusted in the vertical direction, i.e. the auxiliary scanning direction (Z axis direction) by loosening the anchoring screw 366b and can also be rotatably adjusted about the optical axis by loosening the anchoring screw 363b.

In other words, the cylindrical member 361 is capable of both linear in the auxiliary scanning direction (Z axis direction) and rotary adjustment around the optical axis.

Thus, the scanning optical system has means for independently adjusting the cylindrical lens 170 to adjust the beam shape and the fθ lens to adjust the scanning line curvature.

Although the structure and operation of a scanning optical device is described herein with respect to the preferred embodiments, many modifications and changes can be made without departing from the spirit and scope of the invention.

The present disclosure relates to subject matter contained in Japanese Patent Application Nos. HEI 8-037266, filed on Jan. 31, 1996, and HEI 8-046751, filed on Feb. 8, 1996, which are expressly incorporated herein by reference in their entirety.

What is claimed is:

1. A scanning optical device, comprising:

a light source that emits a light beam;

a deflector that deflects and scans said light beam from said light source;

a scanning lens that converges said deflected light beam onto an image surface; and a linear image forming lens disposed between said light source and said deflector, which forms a linear image in a auxiliary scanning direction, wherein at least one lens element of said scanning lens is adjustable, thereby to compensate a curve of a scanning line formed on said image surface, wherein said linear image forming lens is adjustable, thereby to compensate a deformation of a beam shape formed on said image surface, and wherein adjustment of said scanning lens corrects curvature of scan lines associated with adjustment of said linear image forming lens to correct beam shape.

2. The scanning optical device according to claim 1, said linear image forming lens being rotationally adjustable about an optical axis thereof, to compensate for deformation of a beam shape formed on said image surface.

3. The scanning optical device according to claim 2, wherein said linear image forming lens being adjustable in said auxiliary scanning direction, to compensate for deformation of a beam shape formed on said image surface.

4. The scanning optical device according to claim 1, wherein said at least one lens element of said scanning lens is adjustable in said auxiliary scanning direction.

5. The scanning optical device according to claim 4, wherein said at least one lens element is provided with an anamorphic surface having a relatively larger power in said auxiliary scanning direction than in a main scanning direction.

6. The scanning optical device according to claim 4, wherein said at least one lens element has a largest absolute value of refractive power in said scanning lens.

7. The scanning optical device according to claim 4, wherein said at least one lens element is provided with a surface having a smallest absolute value of radius of curvature of all surfaces in said scanning lens.

8. The scanning optical device according to claim 4, wherein said linear image forming lens comprises a cylindrical lens.

9. A scanning optical device, comprising:

a light source that emits a light beam;

a deflector that deflects and scans said light beam from said light source;

a scanning lens having a plurality of lens elements, said scanning lens converging said deflected light beam onto an image surface; and a linear image forming lens disposed between said light source and said deflector, which forms a linear image in an auxiliary scanning direction, wherein one of at least one of the plurality of lens elements of said scanning lens and said linear image forming lens is adjustable, thereby to compensate a curve of a scanning line formed on said image surface, wherein one of an other lens element of said plurality of lens elements of said scanning lens and said linear image forming lens is adjustable, thereby to compensate a deformation of a beam shape, and wherein adjustment of one of said at least one of said plurality of lens elements of said scanning lens and said linear image forming lens corrects curvature of scan lines associated with adjustment of said other lens element of said scanning lens and said linear image forming lens to correct beam shape.

10. The scanning optical device according to claim 9, said other lens element being rotationally adjustable.

* * * * *